(12) United States Patent
Kumble et al.

(10) Patent No.: US 12,265,859 B2
(45) Date of Patent: Apr. 1, 2025

(54) COMPUTING ARCHITECTURE FOR OPTIMALLY EXECUTING SERVICE REQUESTS BASED ON NODE ABILITY AND INTEREST CONFIGURATION

(71) Applicants: Ganeshprasad Giridharasharma Kumble, Karnataka (IN); Karthik Balasubramanian, Karnataka (IN); Anantha Chathanur Raman Krishnan, Princeton, NJ (US)

(72) Inventors: Ganeshprasad Giridharasharma Kumble, Karnataka (IN); Karthik Balasubramanian, Karnataka (IN); Anantha Chathanur Raman Krishnan, Princeton, NJ (US)

(73) Assignee: ANANTHA CHATHANUR RAMAN KRISHNAN, Princeton, NJ (US)

( * ) Notice: Subject to any disclaimer, the term of this patent is extended or adjusted under 35 U.S.C. 154(b) by 443 days.

(21) Appl. No.: 17/257,778

(22) PCT Filed: Jul. 5, 2019

(86) PCT No.: PCT/IB2019/055751
§ 371 (c)(1),
(2) Date: Jan. 4, 2021

(87) PCT Pub. No.: WO2020/008427
PCT Pub. Date: Jan. 9, 2020

(65) Prior Publication Data
US 2022/0138020 A1    May 5, 2022

(30) Foreign Application Priority Data

Jul. 5, 2018  (IN) .............................. 201811025043
Jul. 5, 2018  (IN) .............................. 201811025044
Jul. 5, 2018  (IN) .............................. 201811025045

(51) Int. Cl.
*G06F 9/50*    (2006.01)

(52) U.S. Cl.
CPC .......... *G06F 9/5083* (2013.01); *G06F 9/5044* (2013.01)

(58) Field of Classification Search
CPC ......... G06F 9/5083; G06F 9/5044; G06F 8/61
See application file for complete search history.

(56) References Cited

U.S. PATENT DOCUMENTS 9,208,032 B1 * 12/2015 McAlister .............. G06Q 40/04
2016/0226722 A1 * 8/2016 Corcoran ................ H04L 67/63

* cited by examiner

*Primary Examiner* — Sisley N Kim

(57) ABSTRACT

The present disclosure relates to a system for executing a plurality of service requests (SRs) from corresponding plurality of user computing devices, the system comprising a distributed compute (DC) that forms part of a distributed network, the DC having at least one processor that executes one or more routines stored in an operatively coupled memory to enable receipt of the plurality of service requests in a heterogeneous interaction pool, wherein the DC further comprises a system state manager (SSM) that, based on at least one common attribute of each SR in the interaction pool, identifies an appropriate node (N) from one or more available nodes that has an ability and the attribute-based interest configuration to execute the respective SR, and transmits the respective SR to the identified node (N) for execution.

20 Claims, 13 Drawing Sheets

COMPUTING ARCHITECTURE FOR OPTIMALLY EXECUTING SERVICE REQUESTS BASED ON NODE ABILITY AND INTEREST CONFIGURATION

FIELD OF INVENTION

The present disclosure relates to computing architectures. In particular, the present disclosure relates to a system and method of a computing architecture that enables optimal and efficient execution of service requests (SRs) through one or more nodes/computing nodes/devices.

BACKGROUND OF INVENTION

The background description includes information that may be useful in understanding the present invention. It is not an admission that any of the information provided herein is prior art or relevant to the presently claimed invention, or that any publication specifically or implicitly referenced is prior art.

We live in a digitally intensive era, where people and businesses are constantly interacting and relying upon internet protocols, as well as messaging systems that are easy for deployment, and secure to manage user data. The existing traditional systems as well as emerging patterns in distributed systems cannot harness value out of such interactions that could potentially unlock new business potentials due to demands such as tremendous amount of accurate data points and advanced models, hence often arriving at ineffective results due to lack of context.

Distributed and peer-to-peer networks such as the Blockchain are well known for maintaining provenance but are inefficient in persisting and managing multivariate payloads directly at the storage level, due to its data architectural constraints. This results in a loss of transactional context, due to, but not limited to, lack of value measure, inadequate support to big data cognition, partial scale-outs, inadequate throughput, gas volatility and hard forks. Also, existing node-based computing architectures are agnostic of the interest of the node (N) i.e. the service requests that the node wishes to execute/process, and also the ability of the node to process a particular SR of interest.

There is therefore a need in the art for a system to resolve these issues using a multilateral approach of establishing a truly distributed intelligence abled by provenance, creating context with multiple information vectors—resulting in meaningful business interactions. The system and underlying methods should also address the need for distribution by distributing logical services, compute as well as storage to ensure that there is no single point of failure, yet very easy to deploy applications, and use them.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities or dimensions of items, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

The recitation of ranges of values herein is merely intended to serve as a shorthand method of referring individually to each separate value falling within the range. Unless otherwise indicated herein, each individual value is incorporated into the specification as if it were individually recited herein.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

OBJECTS OF THE INVENTION

Some of the objects of the present disclosure, which at least one embodiment herein satisfies are as listed herein below.

It is an object of the present disclosure to enable processing of a service requests (SR) through a nodes that has an interest and/or an ability of executing said SR, said processing of the SR being managed by a system state manager (SSM) of a distributed compute (DC) engine/element of the proposed system.

It is further an object of the present disclosure to create/instantiate/generate a super state structure (SSS) that can store the metadata associated with the SR including but not limited to cause of the SR, identity of the SR, what/where/how aspects pertaining to the SR.

It is an object of the present disclosure to provide for a simplified and combined approach to a network system that collectively verifies transactions, collects descriptive information, and performs analytical operations to derive insights.

It is another object of the present disclosure to provide for a system that enables a persisting state of accounts with attributes such as nonce, balance of a virtual currency, balance of heterogeneous tokens, and an array of multivariate data structures describing inter-dimensional values pertaining to a transaction.

Yet another object of the present disclosure is to provide for a system that has an ability to transact native virtual currency, heterogenous tokens, transaction descriptors between each other and vice versa.

It is an object of the present disclosure to provide for a system that collects measures of disparate behavior of actors involved across different types of transactions originating from multiple program applications.

It is another object of the present disclosure to provide for a system that stores information on an external storage realm capable of storing large volumes of various forms of data and maintain the cryptographic state changes made to the data.

It is yet another object of the present disclosure to provide for a system that withstands network's availability during abrupt changes occurred in the network strength and node count.

It is an object of the present disclosure to provide for a system that allows all actors to choose the level of trust needed to approve of the transaction between the parties.

It is another object of the present disclosure to provide for a system that hosts nodes with disparate computational capacity to ensure transaction finality.

It is an object of the present disclosure to provide for a system that decentralizes access to host various assets such as, but not limited to, native virtual currency, heterogenous tokens, transaction descriptors, logical application programs, libraries, stored procedures, datastores.

It is another object of the present disclosure to provide for a system that facilitates application program developers with an Integrated Developer Environment for design, development, testing and simulation of business and user experience logic, by providing standard consumable libraries that enable the developer to identify, authenticate and manage actors within the realm of the application developed.

It is yet another object of the present disclosure to provide for a system to create, re-generate, distribute and purge heterogeneous tokens by specifying the unique characteristics by which the same can be recognized.

It is an object of the present disclosure to provide for a system that facilitates a majority based voting booth for significant breaking changes that are proposed in the upcoming upgrade of the network by allowing holders of the native virtual currency to vote for changes in by casting either 'yay', 'nay' or 'abstain'.

SUMMARY OF THE INVENTION

This summary is provided to introduce simplified concepts of a computing architecture for optimally executing service requests based on node ability and interest configuration, which are further described below in the Detailed Description. This summary is not intended to identify key or essential features of the claimed subject matter, nor is it intended for use in determining/limiting the scope of the claimed subject matter.

In an aspect, present disclosure elaborates upon a system for executing a plurality of service requests (SRs) from corresponding plurality of user computing devices. The system can include: a distributed compute (DC) that can form part of a distributed network, the DC having at least one processor that can execute one or more routines stored in an operatively coupled memory to enable receipt of the plurality of service requests in a heterogeneous interaction pool, wherein the DC can further include a system state manager (SSM) that, based on at least one common attribute of each SR in the interaction pool, can identify an appropriate node (N) from one or more available nodes that has an ability and the attribute-based interest configuration to execute the respective SR, and can transmit the respective SR to the identified node (N) for execution.

In another aspect, the DC can be operatively and communicatively coupled with a distributed storage (DS), the DS being configured to store any or a combination of output of the execution of the SR by the identified node, new computed state after execution of the SR by the identified node, and a super state structure (SSS) representing metadata associated with the SR or output of the execution of the SR by the identified node.

In another aspect, the SSS can represent information indicative of the identity of the SR, an interaction vector pertaining to the SR, method of execution of the SR, and cause/intent behind the SR, the cause/intent at least including depiction of why the SR was executed.

In yet another aspect, the interaction vector can be represented through any or a combination of economic value of the SR, right of possession of the SR, emotion parameters pertaining to the SR, social parameters pertaining to the SR, time value parameters pertaining to the SR, and privilege dimension associated with the SR.

In an aspect, the DS can further include: a storage interface to communicate with Node State Manager (NSM) of the DC; and a persistence manager to ensure that data being stored in the DS remains persistent within the node and across the DS.

In another aspect, the DC can further include a high level language interpreter to process and interpret at least one SR before execution of the at least one SR by an identified node.

In yet another aspect, the DC can further include a common execution environment to enable execution of each of the plurality of SRs in the common execution environment.

In an aspect, the one or more available nodes can be a distributed set of nodes that can be remotely but operatively coupled with the DC.

In another aspect, at least one node of the one or more available nodes can be owned by a node owner, the node owner being able to configure an interest list for the at least one node such that the at least one node can process a given SR based at least on the interest list in a manner that if the given SR belongs to an asset class that forms part of the interest list, the at least one node can process the given SR.

In yet another aspect, the attribute-based interest configuration can map to the interest list.

In an aspect, the system can form part of an infrastructure environment that can be operatively and communicatively coupled with a service environment and a consumer environment, wherein the consumer environment can raise the plurality of SRs that can be received at a service interface of the service environment.

In another aspect, the service environment can further include an identity service that can be operatively coupled with the service interface such that upon the service interface classifying the received plurality of SRs based on one or more factors, the classified SRs can be received at the identity service for authentication by an identity verification logic.

In yet another aspect, the authenticated SRs can be associated with respective authentication identifiers that map to corresponding user wallets.

In an aspect, present disclosure elaborates upon a method for executing a plurality of service requests (SRs) from corresponding plurality of user computing devices, the method comprising the steps of: configuring a distributed compute (DC) that can form part of a distributed network, the DC having at least one processor that can execute one or more routines stored in an operatively coupled memory to enable receipt of the plurality of service requests in a heterogeneous interaction pool; running a system state manager (SSM) that can form part of the DC such that the SSM, based on at least one common attribute of each SR in the interaction pool, can identify an appropriate node (N) from one or more available nodes that has an ability and the attribute-based interest configuration to execute the respective SR; and transmitting, through the SSM, the respective SR to the identified node (N) for execution.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

Various objects, features, aspects and advantages of the present disclosure will become more apparent from the following detailed description of preferred embodiments, along with the accompanying drawing figures in which like numerals represent like features.

BRIEF DESCRIPTION OF THE DIAGRAMS

The novel features believed characteristic of the invention are set forth in the claims. The invention will be further described as an illustrative embodiment in conjunction with the attached drawings in which:

DETAILED DESCRIPTION

Figure 1:
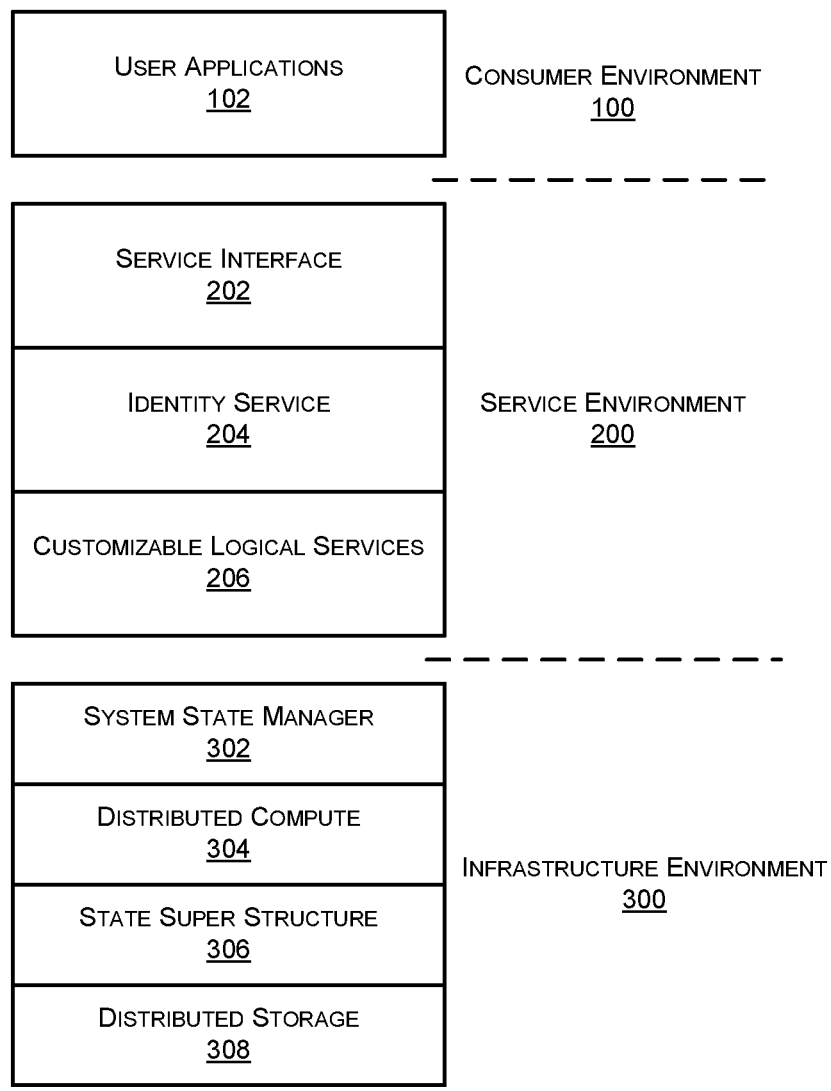
FIG. 1 illustrates the conceptual model and architecture of the proposed system in accordance with an exemplary embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims. In the description numerous specific details are set forth in order to provide a thorough understanding of embodiments of the present invention. However, it will be apparent to one skilled in the art that embodiments of the present invention may be practiced without some of these specific details.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software.

The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Those of ordinary skill in the art further understand that any exemplary hardware, software, processes, methods, and/or operating systems described herein are for illustrative purposes and, thus, are not intended to be limited to any particular named element.

Embodiments of the present invention may be provided as a computer program product, which may include a machine-readable storage medium tangibly embodying thereon instructions, which may be used to program a computer (or other electronic devices) to perform a process. The term "machine-readable storage medium" or "computer-readable storage medium" includes, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Similarly, any switches shown in the figures are conceptual only. Their function may be carried out through the operation of program logic, through dedicated logic, through the interaction of program control and dedicated logic, or even manually, the particular technique being selectable by the entity implementing this invention Embodiments of the present invention may include various steps that described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product. Further, all methods described herein can be performed in any suitable order unless otherwise indicated herein or otherwise clearly contradicted by context.

The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Computing devices used herein may be any of a variety of types of computing device, including without limitation, a desktop computer system, a data entry terminal, a laptop computer, a notebook computer, a tablet computer, a hand-held personal data assistant, a smartphone, a body-worn computing device incorporated into clothing, a computing device integrated into a vehicle (e.g., a car, a bicycle, etc.), a server, a cluster of servers, a server farm, etc.

The present disclosure relates to a system and method of a computing architecture that enables, through a distributed compute (DC), optimal and efficient execution of service requests (SRs) through one or more nodes/computing nodes/devices based on the measured ability and/or interest configuration of the nodes, and further enables, through a distributed storage (DS), generation and saving of the context of the SR, and saving of the new computed state post SR execution in a state super structure (SSS).

The present disclosure further relates to a system and method for integrating attributes of converging components such as user identity, customizable third party logical services hosted remotely that are accessible over an interface, a dynamic state manager, super data structures of the historic state capturing the intent as well as actor behavior of each composite state transition, and a disparate distributed computational medium along with a disparate distributed storage medium. The proposed system and underlying components are expected to function in a multi-stakeholder distributed network with the ability to orchestrate the network partition and arrangement of nodes based on their economic and asset-specific interests, supported by their historic intentions recorded by the said system.

In an aspect, the proposed system (interchangeably termed as system herein) can be operatively connected to a website accessible by any Internet enabled computing device, and can as well have a mobile application that can be downloaded on mobile devices of different users that can connect to Internet for such connection. In such manner, the proposed system can be available 24*7 to its users. Any other manner of implementation of the proposed system or a part thereof is well within the scope of the present disclosure/invention. The computing device can be a PC, a tablet, a smart phone and other like devices.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Various terms as used herein are shown below. To the extent a term used in a claim is not defined below, it should be given the broadest definition persons in the pertinent art have given that term as reflected in printed publications and issued patents at the time of filing.

In an aspect, present disclosure elaborates upon a system for executing a plurality of service requests (SRs) from corresponding plurality of user computing devices. The system can include: a distributed compute (DC) that can form part of a distributed network, the DC having at least one processor that can execute one or more routines stored in an operatively coupled memory to enable receipt of the plurality of service requests in a heterogeneous interaction pool, wherein the DC can further include a system state manager (SSM) that, based on at least one common attribute of each SR in the interaction pool, can identify an appropriate node (N) from one or more available nodes that has an ability and the attribute-based interest configuration to execute the respective SR, and can transmit the respective SR to the identified node (N) for execution.

In another aspect, the DC can be operatively and communicatively coupled with a distributed storage (DS), the DS being configured to store any or a combination of output of the execution of the SR by the identified node, new computed state after execution of the SR by the identified node, and a super state structure (SSS) representing metadata associated with the SR or output of the execution of the SR by the identified node.

In another aspect, the SSS can represent information indicative of identity of the SR, an interaction vector pertaining to the SR, method of execution of the SR, and cause/intent behind the SR, the cause/intent at least including depiction of why the SR was executed.

In yet another aspect, the interaction vector can be represented through any or a combination of economic value of the SR, right of possession of the SR, emotion parameters pertaining to the SR, social parameters pertaining to the SR, time value parameters pertaining to the SR, and privilege dimension associated with the SR.

In an aspect, the DS can further include: a storage interface to communicate with Node State Manager (NSM) of the DC; and a persistence manager to ensure that data being stored in the DS remains persistent within the node and across the DS.

In another aspect, the DC can further include a high level language interpreter to process and interpret at least one SR before execution of the at least one SR by an identified node.

In yet another aspect, the DC can further include a common execution environment to enable execution of each of the plurality of SRs in the common execution environment.

In an aspect, the one or more available nodes can be a distributed set of nodes that can be remotely but operatively coupled with the DC.

In another aspect, at least one node of the one or more available nodes can be owned by a node owner, the node owner being able to configure an interest list for the at least one node such that the at least one node can process a given SR based at least on the interest list in a manner that if the given SR belongs to an asset class that forms part of the interest list, the at least one node can process the given SR.

In yet another aspect, the attribute-based interest configuration can map to the interest list.

In an aspect, the system can form part of an infrastructure environment that can be operatively and communicatively coupled with a service environment and a consumer environment, wherein the consumer environment can raise the plurality of SRs that can be received at a service interface of the service environment.

In another aspect, the service environment can further include an identity service that can be operatively coupled with the service interface such that upon the service interface classifying the received plurality of SRs based on one or more factors, the classified SRs can be received at the identity service for authentication by an identity verification logic.

In yet another aspect, the authenticated SRs can be associated with respective authentication identifiers that map to corresponding user wallets.

In an aspect, present disclosure elaborates upon a method for executing a plurality of service requests (SRs) from corresponding plurality of user computing devices, the method comprising the steps of: configuring a distributed compute (DC) that can form part of a distributed network, the DC having at least one processor that can execute one or more routines stored in an operatively coupled memory to enable receipt of the plurality of service requests in a heterogeneous interaction pool; running a system state manager (SSM) that can form part of the DC such that the SSM, based on at least one common attribute of each SR in the interaction pool, can identify an appropriate node (N) from one or more available nodes that has an ability and the attribute-based interest configuration to execute the respective SR; and transmitting, through the SSM, the respective SR to the identified node (N) for execution.

The proposed system is a distributed intelligence protocol that creates hybrid cooperative digital mesh by integrating peer-to-peer networks, heterogeneous distributed databases, trustable cognition and connected devices. System and method proposed offer a collective measure to capture disparate behavior of various actors in the network involved in/across different types of interactions on multiple application programs. Proposed system and underlying method can facilitate high availability and automated scale balancing based on a PBFT Hardened Raft consensus algorithm.

FIG. 1 illustrates the architecture of the proposed system in accordance with an exemplary embodiment of the present disclosure.

FIG. 1 illustrates the conceptual model of the proposed system comprising of three working environments. The consumer environment (100) can be a remote environment comprising of a group of applications implemented and deployed on disparate devices of the users. The service environment (200) is a remote environment that receives client requests from the applications and authenticates the requests before processing them to the execution. The infrastructure environment (300) is primarily responsible for facilitating the execution of the processed client requests by hosting all computational and storage nodes (collectively termed as peers). The infrastructure environment (300) is also responsible for maintaining the stability of the entire system by persisting the state and its metadata (referred to as state super structure).

As illustrated in FIG. 1, consumer environment 100 can include user applications 102 that can be configured to issue one or more service requests (SRs); service environment 200 can include service interface 202, identity service 204 and customizable logical services 206; and infrastructure environment 300 can include system state manager (SSM) 302, distributed compute (DC) 304, state super structure 306 and distributed storage 308 (which would be explained subsequently).

In an aspect, the proposed system can form part of an infrastructure environment 300 that can be operatively and communicatively coupled with the service environment 200, and the consumer environment 100, wherein the consumer environment 100 can raise the plurality of SRs that can be received at a service interface 202 of the service environment 200. In an aspect, the service environment 200 can further include an identity service 204 that can be operatively coupled with the service interface 202 such that upon the service interface 202 classifying the received plurality of SRs based on one or more factors, the classified SRs can be received at the identity service for authentication by an identity verification logic (see FIG. 3).

Figure 2:
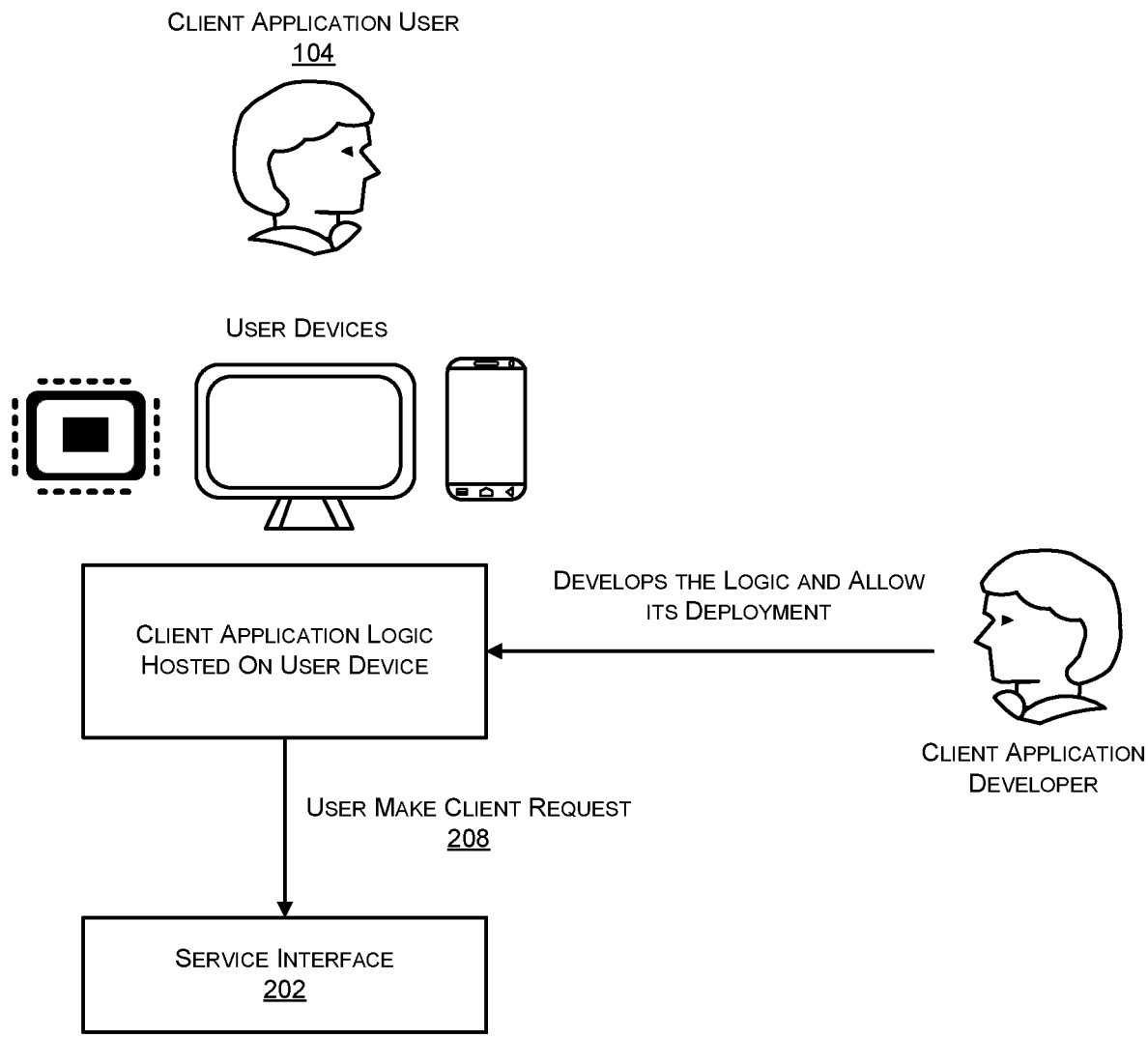
FIG. 2 illustrates detailed overview of the proposed consumer environment in accordance with an exemplary embodiment of the present disclosure.

FIG. 2 illustrates detailed overview of the proposed consumer environment in accordance with an exemplary embodiment of the present disclosure. FIG. 2 illustrates the detailed overview of the proposed consumer environment (100). End users 104 can be configured to incorporate one or more executable applications 102 on their respective computing devices and perform one or more data packets based transactions by making client requests 208 that are subjected to authentication of the linked accounts and wallets. All the client requests made by the applications can be padded/appended along with the identity claimed by the user, and sent to Service Interface (202) of service environment for further processing.

Figure 3:
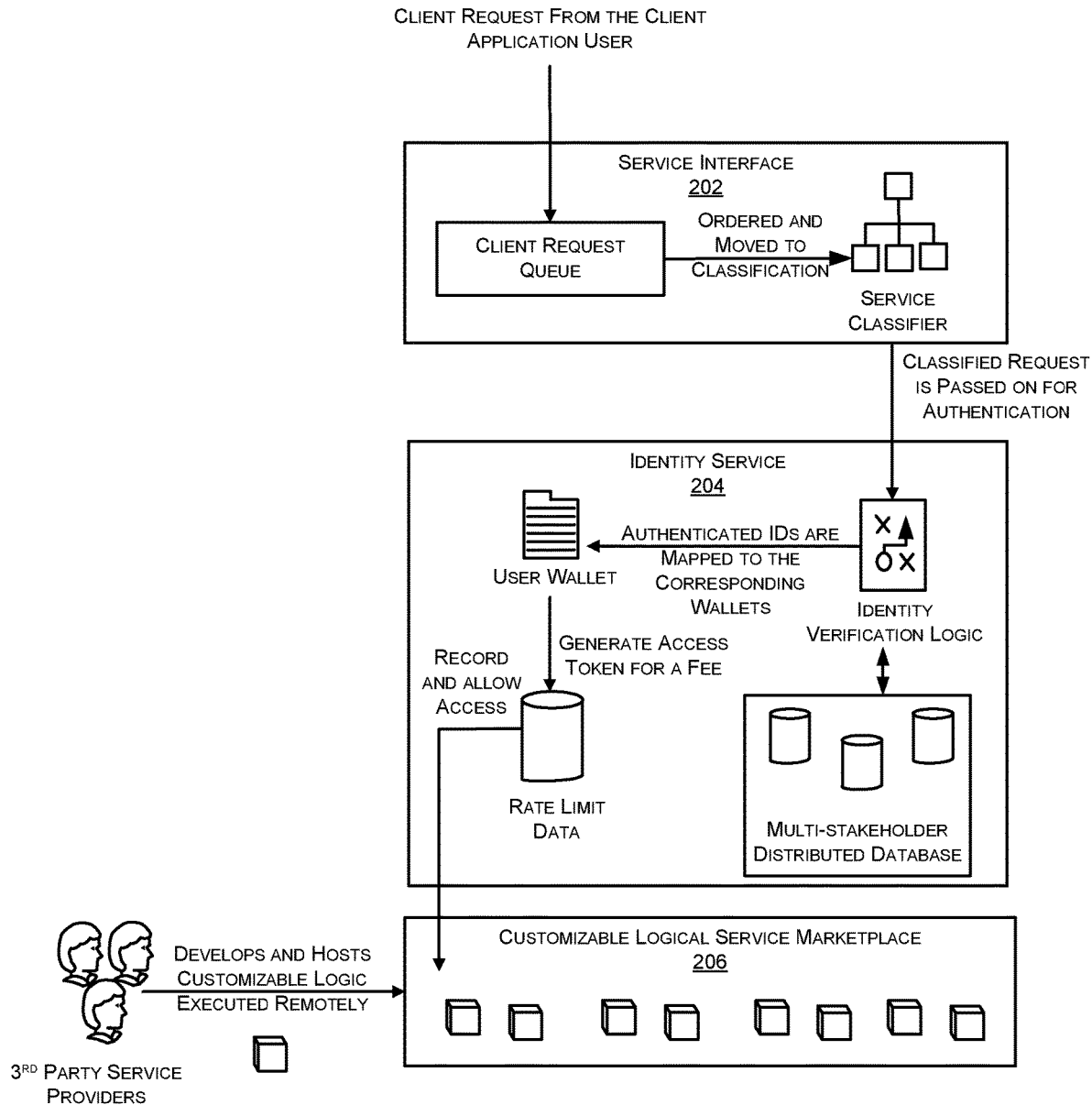
FIG. 3 illustrates detailed overview of the proposed service environment in accordance with an exemplary embodiment of the present disclosure.

FIG. 3 illustrates detailed overview of the proposed service environment in accordance with an exemplary embodiment of the present disclosure.

FIG. 3 illustrates the detailed overview of the proposed service environment (200). This environment is used to pre-processing by ordering classifying and authenticating all the incoming client requests 208 through the Identity Service program (204) before sending it for execution. The identity service is a program that has the capability to verify the identity of the original source of the transaction/client request by cross-verifying with external databases. Once the identity is verified, the fee is deducted from the associated wallet before sending it for execution. Customizable logical services market place 206 may be in communication with identity services 204 to enable market place functionalities.

Figure 4:
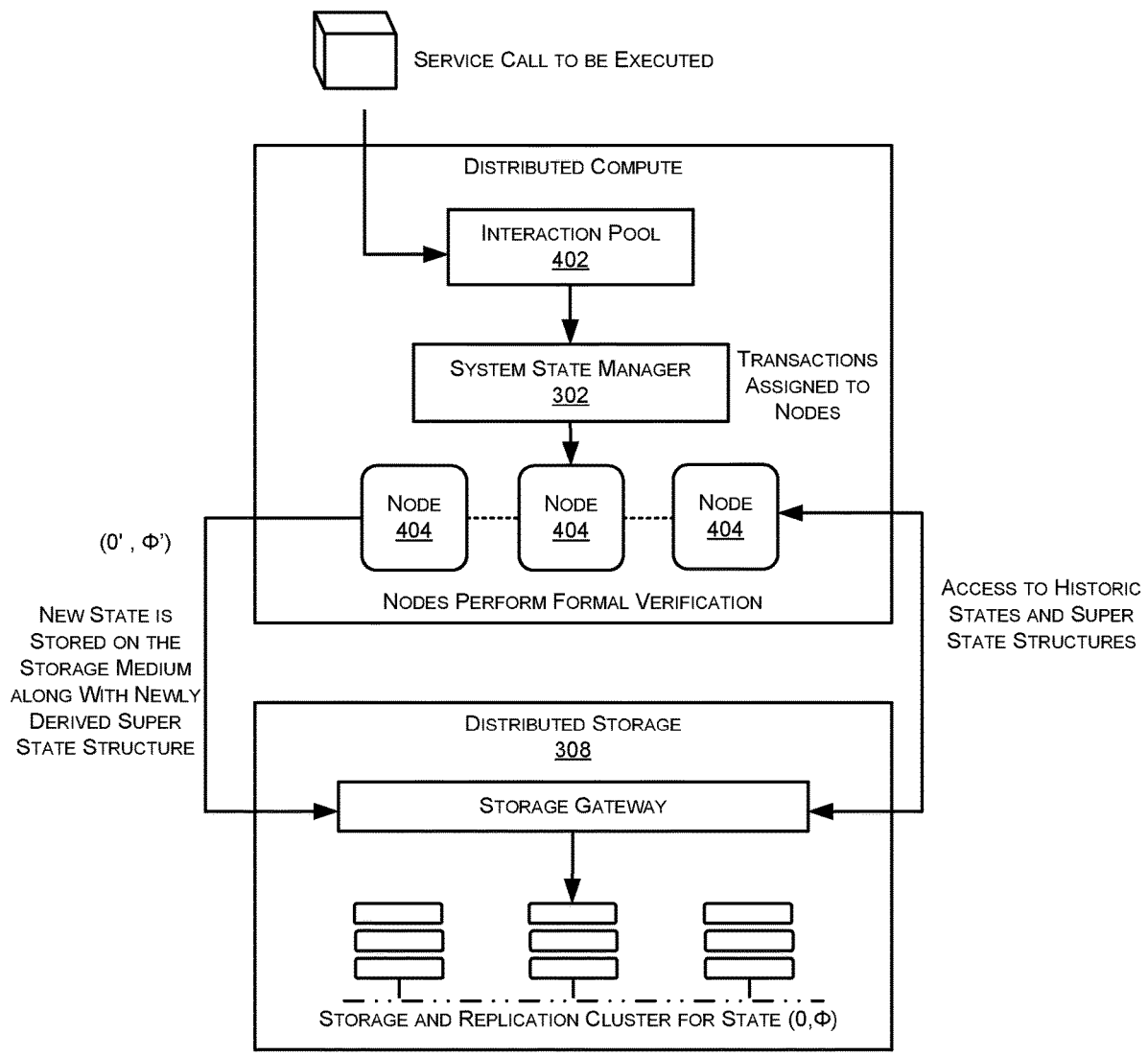
FIG. 4 illustrates detailed overview of the proposed infrastructure environment in accordance with an exemplary embodiment of the present disclosure.

FIG. 4 illustrates detailed overview of the proposed infrastructure environment in accordance with an exemplary embodiment of the present disclosure.

FIG. 4 illustrates the detailed overview of the proposed infrastructure environment (300). The incoming transactions may be placed in the interaction pool (402) temporarily to accommodate any potential delays in the network. The system state manager (302) is a multiplexed logical program that can assign the transactions to relevant nodes 404 (interchangeably termed as compute nodes, as further elaborated) based on the nodes' interest in handling certain transactions of an asset type(s), computed ability (computational ability and/or ability determined based on current load/SRs being executed by the respective node), and a unique score assigned to the node called as node trust quotient (NTQ). Once the incoming transactions are relayed to relevant nodes, the compute nodes (404) in the network are responsible for performing formal verification before executing the transactions. A Distributed Compute (DC) is a network comprising of one or more group of compute nodes, with each compute node consisting of a node state manager (NSM) to communicate results inside and outside of the said environment. Also, the infrastructure environment hosts a Distributed Storage (DS) comprising of one or more groups of storage nodes. A batch of successfully executed transactions make up a "State" (illustrated as O'). A metadata of the state derived from the context collected from the client is also computed and called as "Super State Structure"/"State Super Structure" (illustrated as Ø'). These two outputs from the node are further stored in the storage network 308 of the proposed system for further reference by the compute nodes 404.

Figure 5:
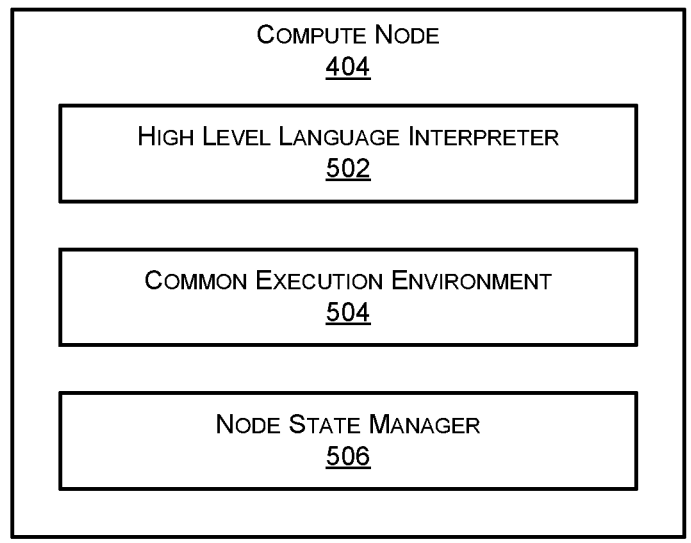
FIG. 5 illustrates the composition of a compute node in accordance with an exemplary embodiment of the present disclosure.

FIG. 5 illustrates composition of a compute node in accordance with an exemplary embodiment of the present disclosure.

FIG. 5 illustrates the internals of a compute node (404). The compute node is a computing machine capable of interpreting incoming transactions, requests and high level language business logic with the ability to interpret them within the system and execute requests by applying formal verification techniques on the state of the sender's wallet. The compute node's execution environment also generates a derivative of transaction's metadata in a complex data structures comprising of various attributes related to the proposed system and its users. Finally, the compute node is also responsible for synchronizing the new states generated by fellow nodes/peers in the network by broadcasting and accepting changes through the Node State Manager. As shown, a compute node can include a high level language interpreter 502, a common execution environment 504 and a node state manager 506.

Figure 6:
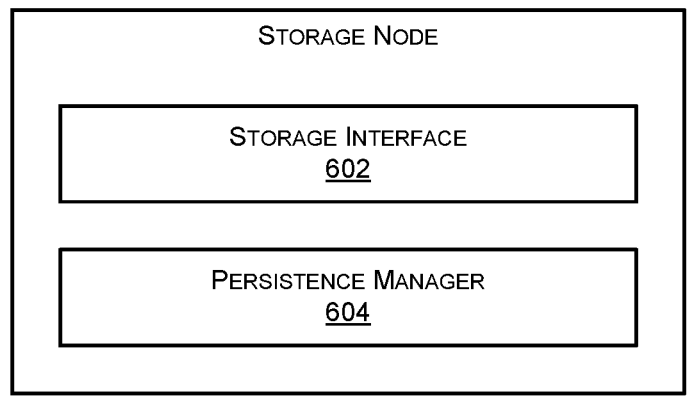
FIG. 6 illustrates the composition of a storage node in accordance with an exemplary embodiment of the present disclosure.

FIG. 6 illustrates composition of a storage node in accordance with an exemplary embodiment of the present disclosure.

FIG. 6 illustrates the internals of a storage node. The storage node is a computing machine dedicated to optimal storage performance. The storage node is responsible for storing the combined output of the compute node environment. The computed state and super state structures are sent to the storage nodes in the tightly coupled network which facilitates remote storage requests through an interface. Storage nodes are also responsible for managing replication, high availability of the information through the persistence manager. As shown, a storage node can include a storage interface 602 and a persistence manager 604.

Figure 7:
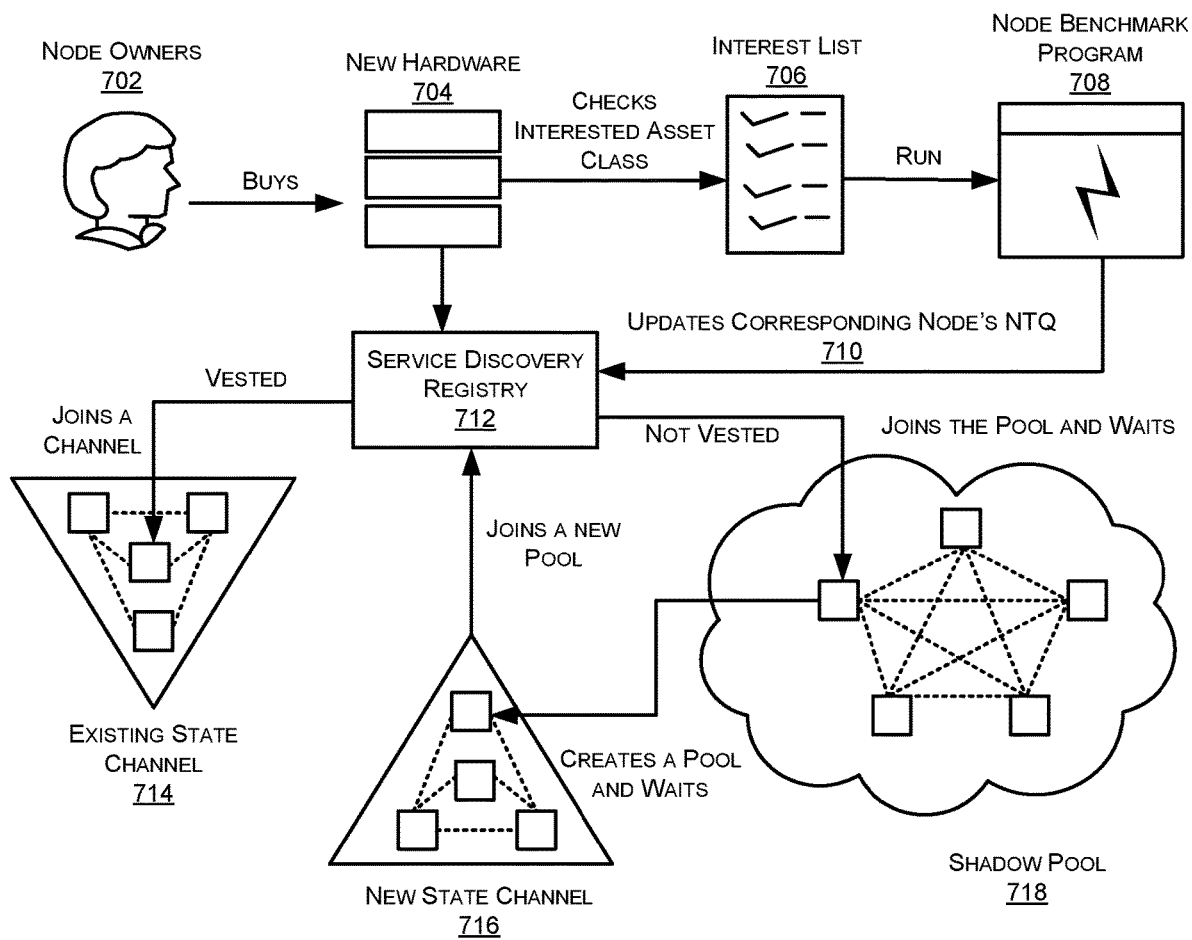
FIG. 7 illustrates the proposed dynamic orchestration of nodes in the network in accordance with an exemplary embodiment of the present disclosure.

FIG. 7 illustrates dynamic orchestration of nodes in the network in accordance with an exemplary embodiment of the present disclosure.

FIG. 7 illustrates the management of existing and onboarding nodes in the network. A node owner 702 acquires a hardware 704 and may install the relevant software supporting either service, compute or storage layer. Once the hardware 704 is provisioned, the node owner 702 may specify any number of transaction types of assets classes that they are interested in the node to process, as shown at interest list 706. Once the interest is established, the node is made to go through a benchmark test to ensure that it is capable of servicing all the claimed interests, as shown at 708.

If the node passes the node benchmark program, a unique score called Node Trust Quotient (NTQ) is calculated and published, as shown at 710. Once the NTQ is published, the node undergoes a membership in a suitable cluster based on the availability prescribed by the Service Discovery Registry shown at 712. Service discovery registry 712 maps all the cluster membership details and orchestrates node availability in case of new computational requirements. If the node is eligible to participate, it may join a suitable cluster specialised in verifying certain classes of assets/types of transactions. These clusters of nodes are called "State Channel" as they generate states in their own disparate channels, as shown at 712. However, if the node is not eligible to join any relevant state channel, it may reside in an idle cluster called the "Shadow Pool" as shown at 718. New state channel may be created from shadow pool as shown at 716.

The process repeats for every addition or removal of nodes. As can be readily understood, nodes can be compute nodes (404).

In this manner proposed system can execute various service requests (SRs) originating from different user computing devices. Based upon attributes of a service request, the system can identify an appropriate node that has the ability and attribute-based interest configuration to execute the SR, and can transmit the SR to the so identified node for execution.

Figure 8:
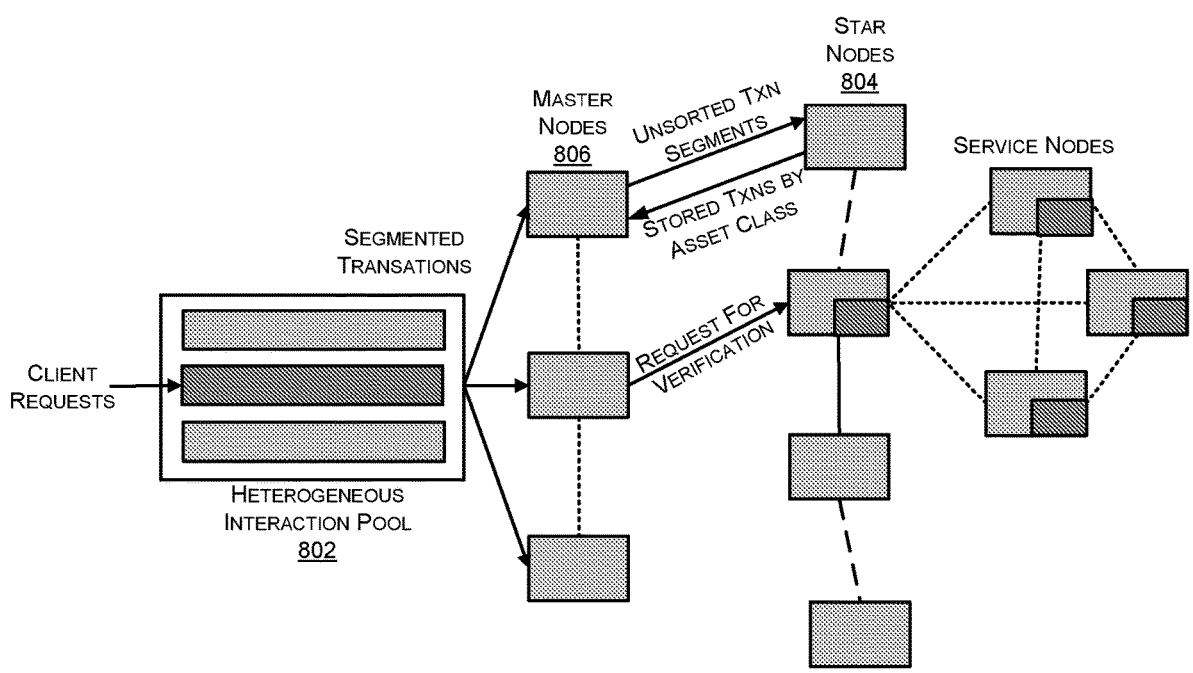
FIG. 8 illustrates the proposed system state manager in accordance with an exemplary embodiment of the present disclosure.

FIG. 8 illustrates a system state manager in accordance with an exemplary embodiment of the present disclosure.

FIG. 8 illustrates the System state manager (302) It is a key component in the infrastructure environment 300 that can enable scalability to the system by intelligently handling the incoming transactions. All the incoming heterogenous transactions of different types and asset classes reside in a common pool 802. These transactions are needed to be segmented (based on the type/asset class) and ordered (by timestamp, nonce etc.) before sending them to the relevant state channels. The compute nodes are formed by a group of state channels. Each state channel has a minimum of 3 nodes with a leader (called as "Star Nodes", shown at 804) node randomly elected by the other members. All star nodes are responsible for cooperating with each other by sharing the new states generated by respective state channels. The star nodes elect among themselves a group of network gatekeepers (called the "master nodes", shown at 806) in through random timeout principle. Only star nodes with a certain NTQ are eligible for the election. All the above is enforced logically by a program called the System state manager 302.

Figure 9:
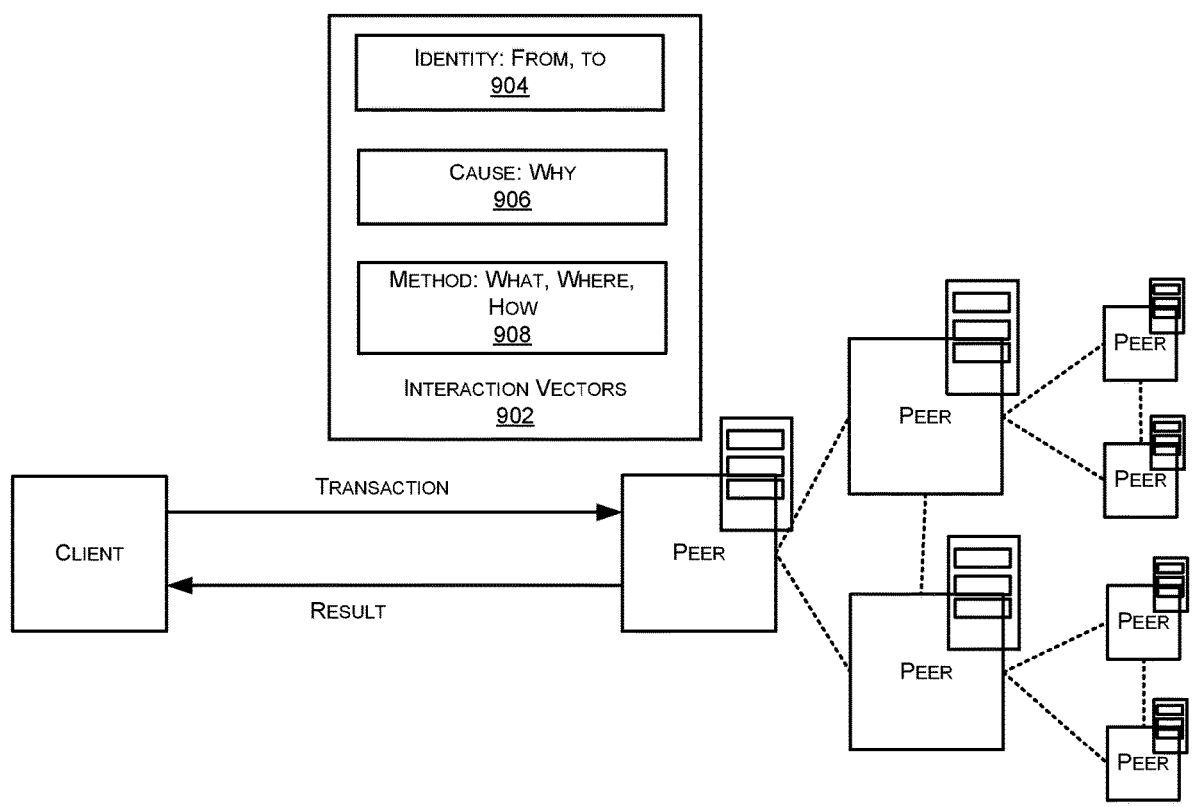
FIG. 9 illustrates the proposed application of interaction vectors on transactions to harness Super State Structure in accordance with an exemplary embodiment of the present disclosure.

FIG. 9 illustrates application of interaction vectors on transactions to harness Super State Structure in accordance with an exemplary embodiment of the present disclosure.

FIG. 9 illustrates how super state structures are created. The client requests/transactions not only carry payload data but also metadata as shown in the note. These metadatas are collectively processed in parallel to formal verification and finally classified into a data structure called "Interaction Vectors", as shown at 902. The Interaction vectors are the data structures applied on to the raw transactional payload to derive full context of the transaction such as Identity vectors (904), Causal vectors (906), and Method vectors (908). The attributes of the interaction vectors pointing to the user wallet can be updated by application of new information sourced by the same vectors.

Figure 10:
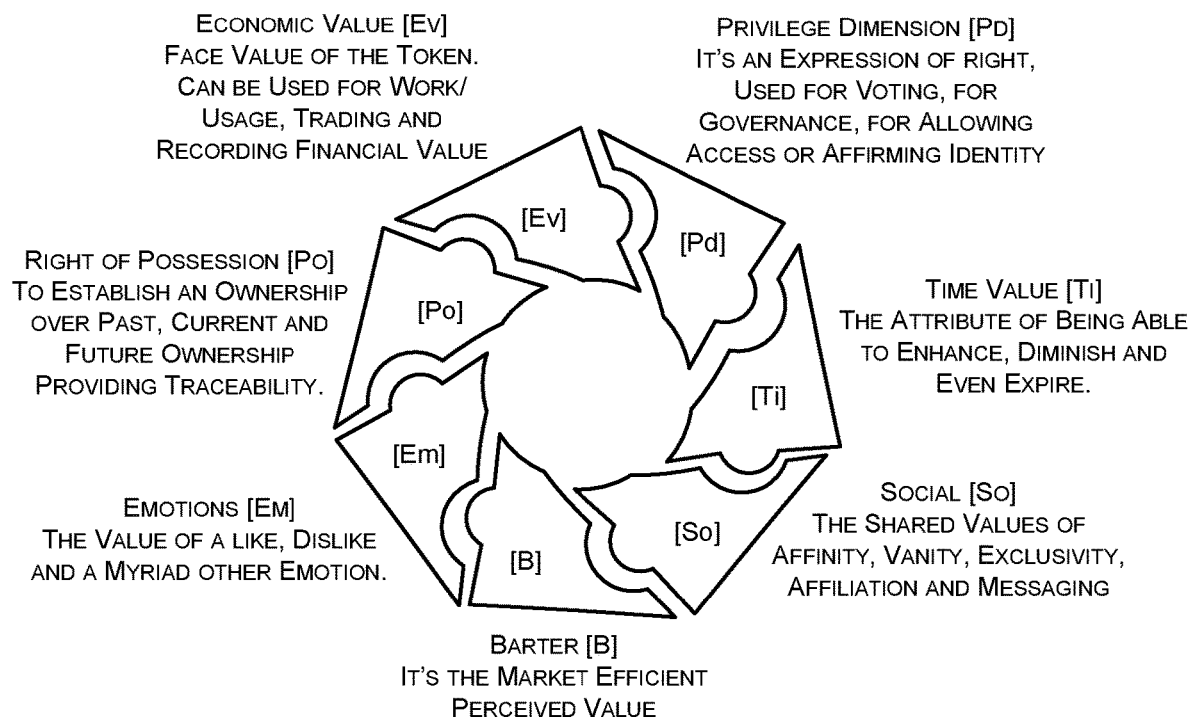
FIG. 10 is a typical illustrative representation of a super state structure in accordance with an exemplary embodiment of the present disclosure.

FIG. 10 is a typical illustrative representation of a super state structure in accordance with an exemplary embodiment of the present disclosure.

FIG. 10 illustrates some of the attributes of the super state structures (SSS). The super state structure can host more than one measurable attributes that can be used by the user while creating a transaction or client service request. All the attributes of the super state structure related to users are persisted in the respective user's wallet, whereas the super state structure related to the entire system is persisted directly in the distributed storage network to support operations carried out by the Distributed Compute network. As illustrated, attributes of SSS can include Economic value, Privilege Dimension, Right of possession, Time value, Emotions and Social, amongst others.

Figure 11:
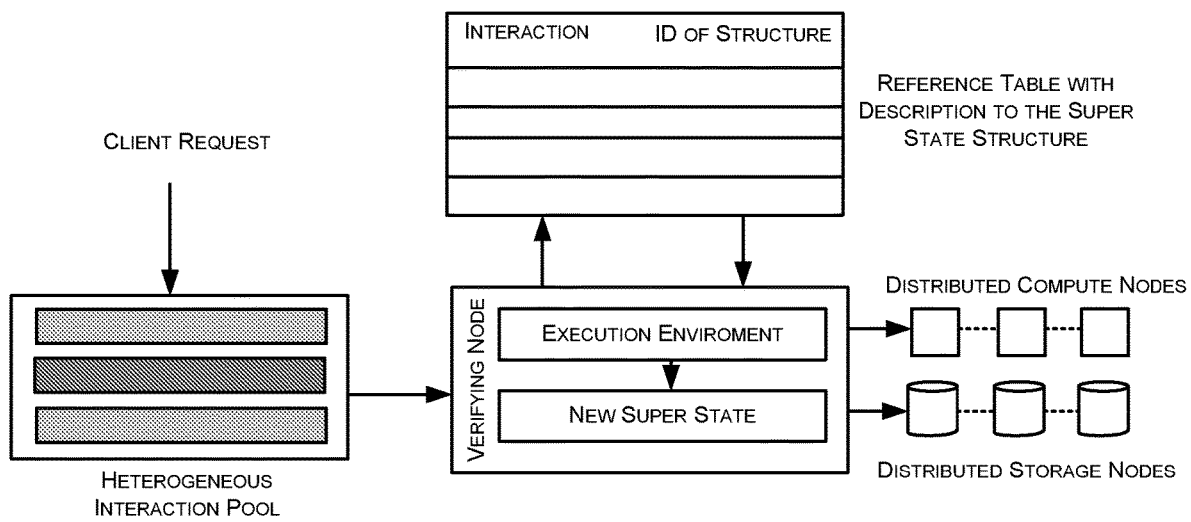
FIG. 11 illustrates the proposed persistence of the super state structures in accordance with an exemplary embodiment of the present disclosure.

FIG. 11 illustrates persistence of the super state structures in accordance with an exemplary embodiment of the present disclosure.

FIG. 11 illustrates the ability of the system to compute, persist and manage the pointers to the super state structures. The metadata accompanied with the transaction is processed by the verifying distributed compute node and the output is mapped into a reference table indexed by interaction. This newly computed state along with its super state structure is distributed to the remaining nodes.

Figure 12:
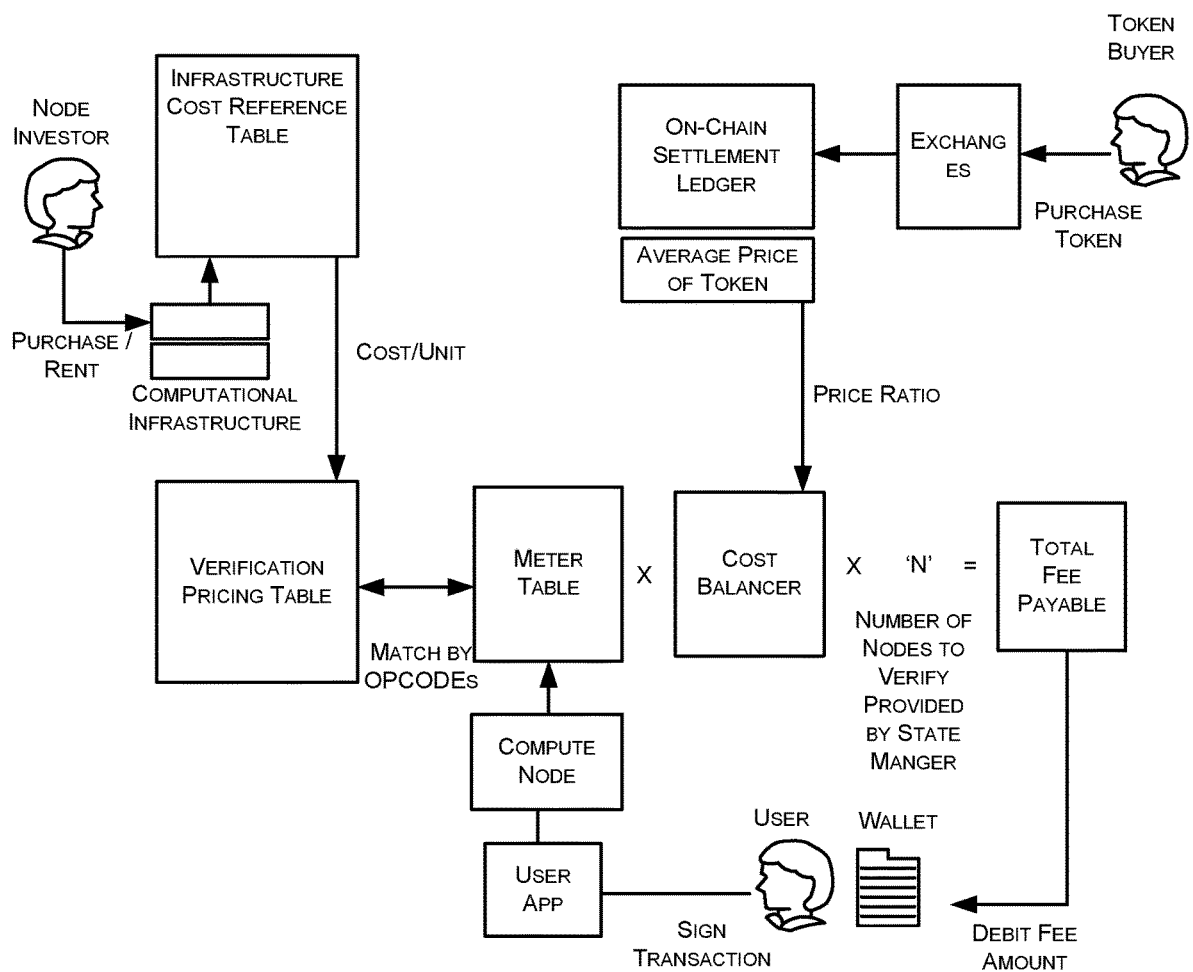
FIG. 12 illustrates the proposed infrastructure cost management in accordance with an exemplary embodiment of the present disclosure.

FIG. 12 illustrates infrastructure cost management in accordance with an exemplary embodiment of the present disclosure.

FIG. 12 illustrates the ability of the system to host an internal token trading ledger database capable of recording the key pair value for the exchange of the native token. With the trade volume and price of the token captured, the system is able to calculate the price ratio between the token and a fiat currency.

The system also captures the cost of compute and storage operations in the same fiat currency. With the price ratio calculated, the system is able to balance the total cost incurred in tokens by varying the price versus the cost. Although the total cost payable in tokens may vary, the net effective cost shall remain the same due to the balancing achieved by the internal token trading ledger database.

Figure 13:
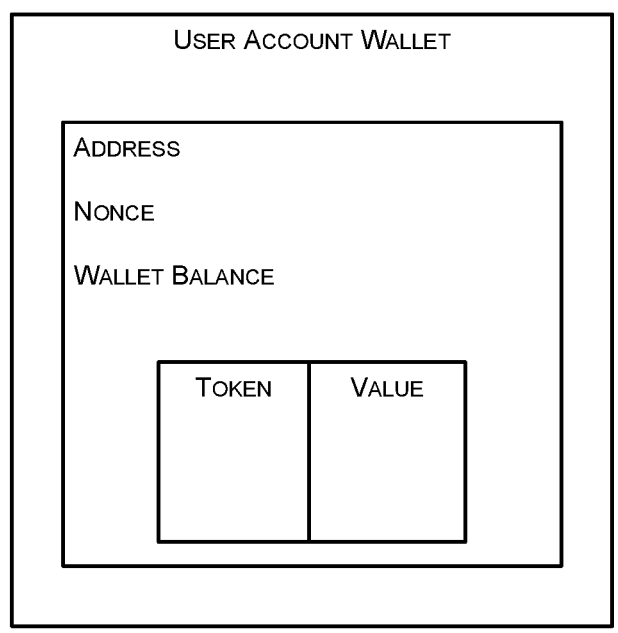
FIG. 13 illustrates a user account or wallet in the proposed system network in accordance with an exemplary embodiment of the present disclosure.

FIG. 13 illustrates a user account or wallet in the proposed system network in accordance with an exemplary embodiment of the present disclosure.

FIG. 13 illustrates the content of a user wallet or a user account persisted in across the service environment and stored permanently in the distributed storage network as part of the state. The minimum attributes exhibited by the user wallet are address—a hexadecimal string that serves as a descriptor, nonce—a transaction counter to the user wallet to potentially handle cases of race condition with propagated transactions in the user client, and wallet balance—a key value mapping to the tokens or tokenized attributes present in the super state structure pertaining to the user.

Figure 14:
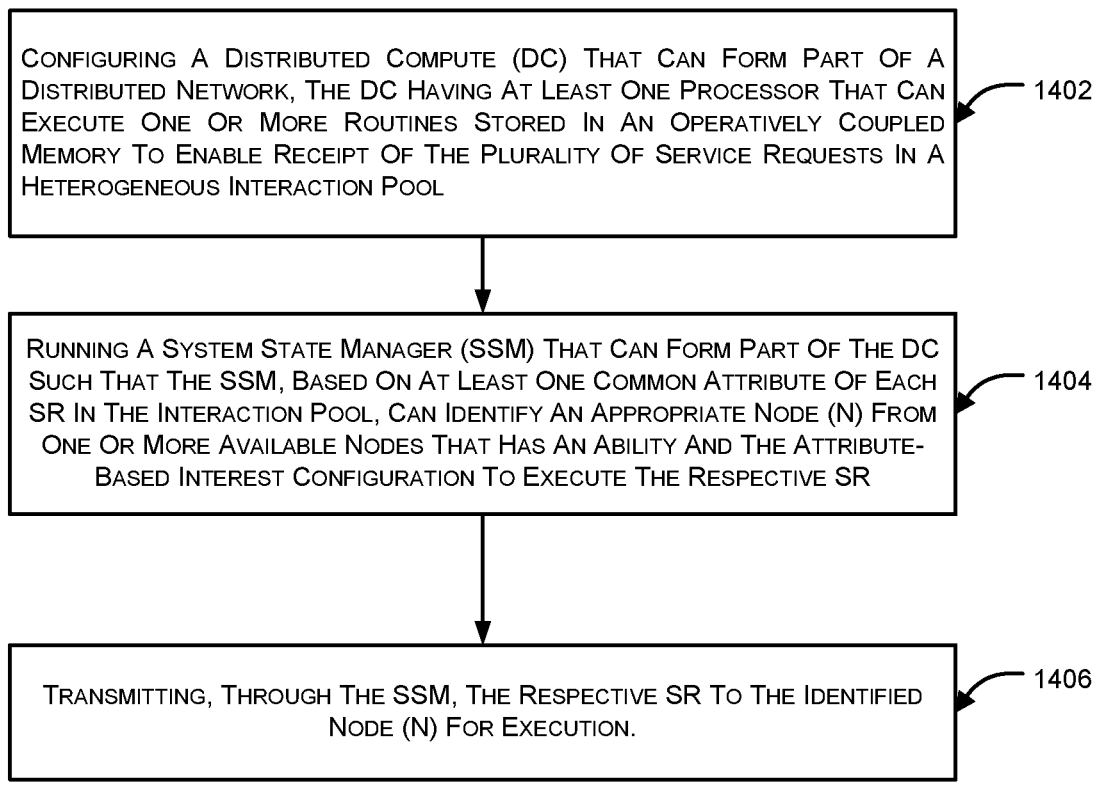
FIG. 14 illustrates a method of working for the proposed system in accordance with an exemplary embodiment of the present disclosure.

FIG. 14 illustrates a method of working for the proposed system in accordance with an exemplary embodiment of the present disclosure.

FIG. 14 illustrates a variant of implementation of the proposed system with specification of the service layer with various 3rd party services hosted on the service marketplace consumable by the users through the service interface.

In an aspect, present disclosure elaborates upon a method for executing a plurality of service requests (SRs) from corresponding plurality of user computing devices.

The method can include, at step 1402, configuring a distributed compute (DC) that can form part of a distributed network, the DC having at least one processor that can execute one or more routines stored in an operatively coupled memory to enable receipt of the plurality of service requests in a heterogeneous interaction pool, and at step 1404, running a system state manager (SSM) that can form part of the DC such that the SSM, based on at least one common attribute of each SR in the interaction pool, can identify an appropriate node (N) from one or more available nodes that has an ability and the attribute-based interest configuration to execute the respective SR.

The method can further include, at step 1406, transmitting, through the SSM, the respective SR to the identified node (N) for execution.

In an aspect, the ability of the node to execute/process the SR can be quantified and agreed to by one or more DCs.

In an exemplary embodiment, proposed system can contain an Integrated Developer Environment that can facilitate the application program developer to specify all business rules and validations required to propagate transactions. The system can contain an integrated peer to peer cryptographic network connecting devices with exclusive computational capabilities that can record transactions as and when occurred. The devices connected to this network have the collective ability to receive, verify, execute, append, and broadcast the transactions propagated or signed by an actor's (user's) account, which can be mutually agreed by the majority of the exclusive nodes. The user can propagate a transaction and can pay in advance a sum of native virtual currency to seek finality. The subset of connected devices can receive the transactions in an ordered, classify them by a defined type, and distribute the ordered set of transactions to respective nodes. The receiving nodes can execute the receiving transaction, load required data from the external storage realms and either harvest, update or persist the descriptors pertaining to the transactions and reflect the changes to the respective involved accounts states thereafter for analytical practices. System can incentivize by dividing the total transaction fee by the number of nodes involved.

In another exemplary embodiment, the proposed system can include special algorithms represented as "Interaction Vectors". The vectors can be applied on transactions propagated by the actors involved in a peer to peer cryptographic network connecting devices with exclusive computational capabilities that can record transactions as and when occurred. The connected devices can collectively execute and apply the vectors onto the receiving transactions that are signed by the actor's account credentials. The harvested values from the application of the interaction vectors can be attributed to the actor's account responsible for the same transaction. The values can be updated in an array of key-value pairs, with each key representing a disparate inter-dimensional value. The transaction descriptors can be updated upon new entry to the array or update of value to an existing element with the same key. The disparate values in the descriptors can be transferred either at a mutual exchange rate to the native virtual currency of the network, or any of the heterogenous tokens.

In yet another exemplary embodiment, proposed system can include node benchmark programs that can measure the economic effort and costs involved in executing an opcode. An Infrastructure Cost Reference Table can be persisted based on the aggregated cost associated with operating the nodes by capacity measured in terms of, but not limited to, CPU Frequency, Primary Memory, Storage, and Bandwidth. The benchmark programs can test and assess a node by sending a specific number of arbitrary messages in an encapsulated virtual network to calculate the responsive potential of the node. The measured throughput can be compared with the average throughput of all the nodes in the network. Upon passing the specification tests during the execution of the Node Benchmark Program, the eligible nodes joining the network can be considered "orphan" role with only an ability to become a member of the shadow pool verifying shadow broadcasts, until the network orchestrator adds the peer into a state channel.

The proposed system can maintain the credibility of the verifying nodes by aggregating the performance and behavior of the nodes and attributing it to NTQ—Node Trust Quotient. Each new node added into the network can be automatically assigned the role of an orphan as mentioned above. The node can be vetted by requesting for vesting a finite number of native virtual currency, as well as uptime to confirm transactions of sorts in the shadow pool for a finite period of time.

Once the node is added into a state channel, the node can be assigned the "Follower" role and hence entitled to verify the transactions passed on to its state channels. However, all follower nodes belonging to arbitrary state channels can be also responsible for verifying the transactions propagated in the shadow broadcasts shared by the grand leader.

In this manner, proposed system establishes distributed intelligence with big data persistence, scalability, maximized throughput and predictable TCO. This enables enterprises to adopt diApps (distributed intelligent apps) for modern "real-world" scenarios that exhibits Upgradability, Agility, Robustness, Security, Scalability, Responsiveness and Accountability.

System and method elaborated establishes various approaches to capture values, and attribute them to respective transactions propagated by actors in the network. The approaches do not merely capture data points. It offers a multi-dimensional value environment for all actors in the network to leverage their respective interests and abilities to leverage services, in a just manner without the need for third party rating agencies.

Proposed system and methods establish various approaches orchestrate, partition, arrange and pass messages in a deterministic manner, thereby encouraging businesses to adopt a minimalistic approach to obtain exponential scaling on various range of computational devices.

The technical advantage of the proposed system lies application of interaction vectors on the heterogenous transactional payload of various encoding types in the form of data harvesting and pattern matching algorithms. The system has the ability to recognize the actors responsible for the transactions—the 'from' accounts propagating the transaction and the 'to' accounts being the beneficiary of the propagated transaction, through the application of "Identity Vectors". Further, the system has the ability to capture the intent behind a propagated transaction, through the application of "Causal Vectors", and the ability to capture the means to achieve the fulfillment and finality of the transactions, through the application of "Method Vectors".

Proposed system has the ability to persist the values captured by the interaction vectors pertaining to transactions of all actors in the network. The proposed system allows the the option to participating connected devices to either store the harvested values within the node or refer to a values persisted in an external realm. Further, proposed system can share the persisted information with devices connected within the network or outside the network for analytical purposes to achieve actionable insights.

Proposed system can orchestrate nodes in a dynamic manner adhering to, but not limited to, Practical Byzantine Fault Tolerance (PBFT) hardened Raft architecture. It has the ability to facilitate high frequency operations by leveraging the reactive actor streams in a deadlock-free "execute-only-once" ordering. Further, proposed system has the ability to facilitate selective hearing in order to form a state channel that can verify respective transactions belonging to a specific asset class relatively ahead of others.

Proposed system can perform message passing to classify and funnel the stream of transactions to respective state channels, in an asynchronous manner. Further, it has the ability to facilitate benchmark programs to test and assess the abilities of the node to formally verify the received transactions as per the definition at the network level scopes and rules.

Proposed system can attribute a node's runtime behaviours such as, but not limited to, the economic and asset type based interest by vesting Native Virtual Currencies and/or heterogenous tokens, sincerity, reliability, availability etc. into an alphanumeric value called to the node as its Node Trust Quotient (NTQ) used to reflect the node's runtime behaviours. It can provide stable gas costs and Total Cost of Ownership (TCO) in running and using applications by persisting the cumulative price ratios of the tokens to a fiat currency of choice and vice-versa by persisting an inline trade ledger, for purposes such as, but not limited to, price discovery to enable stable gas costs and Total Cost of Ownership (TCO) in running an application. Further, proposed system can manage volatility in transaction fee/cost by balancing the fee by using with the price ratio.

Advantages of the Invention

Present disclosure provides for a simplified and combined approach to a network system that collectively verifies transaction, collects descriptive information and performs analytical operations to derive insights.

The technical advantage of the proposed system lies in persisting state of accounts with attributes such as nonce, Balance of a virtual currency, Balance of heterogenous app tokens, and an array of multivariate data structures describing inter-dimensional values pertaining to a transaction.

Yet another technical advantage is the ability to transact the native virtual currency, heterogenous tokens, transaction descriptors between each other and vice versa.

Yet another technical advantage is the ability of the system to collect measures of disparate behavior of actors involved across different types of transactions originating from multiple program applications.

Another technical advantage is the ability of the system to store information on an external storage realm capable of storing large volumes of various forms of data and maintain the cryptographic state changes made to the data.

Yet another technical advantage is the ability of the system to withstand network's availability during abrupt changes occurred in the network strength and node count.

Another technical advantage is the ability of the system to allow all actors to choose the level of trust needed to approve of the transaction between the parties.

Yet another technical advantage is the ability of the system to host nodes with disparate computational capacity to ensure Txn finality Another technical advantage is the ability of the system to facilitate apt gas usage by pegging the native virtual currency to an asset consistently worth US Dollar and vary the price with units required to execute transaction.

Yet another technical advantage is the ability of the system to decentralize access to host various assets such as, but not limited to, native virtual currency, heterogenous tokens, transaction descriptors, logical application programs, libraries, stored procedures, datastores.

Yet another technical advantage is the ability of the system to facilitate application program developers with an Integrated Developer Environment for design, development, testing and simulation of business and user experience logic, by providing standard consumable libraries that enables the developer to identify, authenticate and manage actors within the realm of the application developed.

Another technical advantage is the ability of the system to create, re-generate, distribute and purge heterogenous tokens by specifying the unique characteristics by which the same can be recognized.

Yet another technical advantage is the ability of the system to facilitate a majority based voting booth for significant breaking changes that are proposed in the upcoming upgrade of the network by allowing holders of the native virtual currency to vote for changes in by casting either 'yay', 'nay' or 'abstain'.

We claim:

1. A system for executing a plurality of service requests (SRs) from corresponding plurality of user computing devices, said system comprising:
    a distributed compute (DC) that forms part of a distributed network, said DC having at least one processor that executes one or more routines stored in an operatively coupled memory to enable receipt of the plurality of service requests in an interaction pool; and
    a system state manager (SSM) that, based on at least one common attribute of each SR in the interaction pool, identifies a compute node from one or more available compute nodes comprised in the distributed compute that has an ability and an interest list configuration to execute said respective SR, and transmits said respective SR to said identified compute node for execution, wherein said interest list configuration indicates an asset class of service requests that said identified compute node is configured to execute, and wherein said DC is operatively and communicatively coupled with a distributed storage (DS), said DS being configured to store a super state structure (SSS) representing metadata associated with said SR or output of said execution of said SR by said identified compute node, wherein said SSS represents information indicative of identity of the SR, an interaction vector pertaining to the SR, method of execution of the SR, and cause/intent behind the SR, said cause/intent at least including depiction of why the SR was executed.

2. The system as claimed in claim 1, wherein said DS is further configured to store any or a combination of output of said execution of said SR by said identified compute node, and new computed state after execution of said SR by said identified compute node.

3. The system as claimed in claim 1, wherein said interaction vector is represented through any or a combination of economic value of said SR, right of possession of said SR, emotion parameters pertaining to said SR, social parameters pertaining to said SR, time value parameters pertaining to said SR, and privilege dimension associated with said SR.

4. The system as claimed in claim 2, wherein said DS further comprises:
    a storage interface to communicate with Node State Manager (NSM) of the DC; and
    a persistence manager to ensure that data being stored in the DS remains persistent within the node and across the DS.

5. The system as claimed in claim 1, wherein said DC further comprises a high level language interpreter to process and interpret at least one SR before execution of said at least one SR by an identified compute node.

6. The system as claimed in claim 1, wherein said DC further comprises a common execution environment to enable execution of each of said plurality of SRs in said common execution environment.

7. The system as claimed in claim 1, wherein the one or more available nodes are a distributed set of nodes that are remotely but operatively coupled with the DC.

8. The system as claimed in claim 1, wherein at least one node of the one or more available nodes is owned by a node owner, said node owner being able to configure an interest list for said at least one node such that said at least one node processes a given SR based at least on the interest list in a manner that if said given SR belongs to an asset class that forms part of said interest list, said at least one node processes said given SR.

9. The system as claimed in claim 1, wherein said system forms part of an infrastructure environment that is operatively and communicatively coupled with a service environment and a consumer environment, wherein said consumer environment raises said plurality of SRs that are received at a service interface of the service environment.

10. The system as claimed in claim 6, wherein said service environment further comprises an identity service that is operatively coupled with said service interface such that upon the service interface classifying the received plurality of SRs based on one or more factors, the classified SRs are received at the identity service for authentication by an identity verification logic.

11. The system as claimed in claim 10, wherein said authenticated SRs are associated with respective authentication identifiers that map to corresponding user wallets.

12. The system as claimed in claim 1, wherein the system is configured with an ability to host an internal settlement ledger that captures price of tokens, and uses said capturing to balance the operational cost of executing said SR by said identified compute node.

13. A method for executing a plurality of service requests (SRs) from corresponding plurality of user computing devices, said method comprising the steps of:
   configuring a distributed compute (DC) that forms part of a distributed network, said DC having at least one processor that executes one or more routines stored in an operatively coupled memory to enable receipt of the plurality of service requests in an interaction pool;
   running a system state manager (SSM), based on at least one common attribute of each SR in the interaction pool, to identify a compute node (N) from one or more available compute nodes comprised in the DC, that has an ability and an interest list configuration to execute said respective SR; and
   transmitting, through the SSM, said respective SR to said identified compute node (N) for execution, wherein said interest list configuration indicates an asset class of service requests that said identified compute node is configured to execute, and wherein said DC is operatively and communicatively coupled with a distributed storage (DS), said DS being configured to store a super state structure (SSS) representing metadata associated with said SR or output of said execution of said SR by said identified compute node, wherein said SSS represents information indicative of identity of the SR, an interaction vector pertaining to the SR, method of execution of the SR, and cause/intent behind the SR, said cause/intent at least including depiction of why the SR was executed.

14. The method as claimed in claim 13, wherein said DS is further configured to store any or a combination of output of said execution of said SR by said identified compute node, and new computed state after execution of said SR by said identified compute node.

15. The method as claimed in claim 13, wherein said interaction vector is represented through any or a combination of economic value of said SR, right of possession of said SR, emotion parameters pertaining to said SR, social parameters pertaining to said SR, time value parameters pertaining to said SR, and privilege dimension associated with said SR.

16. The method as claimed in claim 14, wherein said DS further comprises: a storage interface to communicate with Node State Manager (NSM) of the DC; and a persistence manager to ensure that data being stored in the DS remains persistent.

17. The method as claimed in claim 13, wherein said DC further comprises a high level language interpreter to process and interpret at least one SR before execution of said at least one SR by an identified compute node.

18. The method as claimed in claim 13, wherein said DC further comprises a common execution environment to enable execution of each of said plurality of SRs in said common execution environment.

19. The method as claimed in claim 13, wherein the one or more available nodes are a distributed set of nodes that are remotely but operatively coupled with the DC, wherein at least one node of the one or more available nodes is owned by a node owner, said node owner being able to configure an interest list for said at least one node such that said at least one node processes a given SR based at least on the interest list in a manner that if said given SR belongs to an asset class that forms part of said interest list, said at least one node processes said given SR.

20. The method as claimed in claim 13, wherein said ability is quantified and agreed to by one or more DCs.

* * * * *